United States Patent
Tuerk et al.

(10) Patent No.: US 12,110,475 B2
(45) Date of Patent: Oct. 8, 2024

(54) PROCESS FOR MANUFACTURING ALKOXYLATED POLYETHYLENEIMINES

(71) Applicant: BASF SE, Ludwigshafen am Rhein (DE)

(72) Inventors: Holger Tuerk, Ludwigshafen (DE); Thomas Wesley Holcombe, Shanghai (CN); Andrew David Green, London (GB); Alyn James Parry, London (GB); Julie Bennett, London (GB); Robert John Carswell, London (GB)

(73) Assignee: BASF SE, Ludwigshafen am Rhein (DE)

(*) Notice: Subject to any disclaimer, the term of this patent is extended or adjusted under 35 U.S.C. 154(b) by 887 days.

(21) Appl. No.: 17/267,067

(22) PCT Filed: Jul. 30, 2019

(86) PCT No.: PCT/EP2019/070480
§ 371 (c)(1),
(2) Date: Feb. 9, 2021

(87) PCT Pub. No.: WO2020/030469
PCT Pub. Date: Feb. 13, 2020

(65) Prior Publication Data
US 2021/0309934 A1    Oct. 7, 2021

(30) Foreign Application Priority Data
Aug. 10, 2018    (EP) .................................... 18188508

(51) Int. Cl.
*C11D 3/37*    (2006.01)
*C08G 73/02*   (2006.01)
*C11D 1/00*    (2006.01)

(52) U.S. Cl.
CPC .......... *C11D 1/008* (2013.01); *C08G 73/0206* (2013.01); *C11D 2111/12* (2024.01)

(58) Field of Classification Search
CPC ....... C11D 3/37; C11D 3/3707; C11D 3/3723; C08G 73/0206; C08G 73/024
See application file for complete search history.

(56) References Cited

U.S. PATENT DOCUMENTS

| | | |
|---|---|---|
| 10,619,042 B2 | 4/2020 | Labeque et al. |
| 10,662,397 B2 | 5/2020 | Ebert et al. |
| 10,800,887 B2 | 10/2020 | Hueffer et al. |
| 10,907,259 B2 | 2/2021 | Hueffer et al. |
| 2010/0216949 A1 | 8/2010 | Friedrich et al. |

FOREIGN PATENT DOCUMENTS

| | | | |
|---|---|---|---|
| BR | 112014027872 A2 | 6/2017 | |
| EP | 112593 | * 12/1983 | ............... C11D 3/30 |
| EP | 0112593 A2 | 7/1984 | |
| EP | 2847251 A1 | 3/2015 | |
| JP | 2002358822 A | 12/2002 | |
| JP | 2018514645 A | 6/2018 | |
| JP | 2019513643 A | 5/2019 | |
| JP | 2019521202 A | 7/2019 | |
| RU | 2653364 C2 | 5/2018 | |
| WO | 9901530 A1 | 1/1999 | |
| WO | 9916811 A1 | 4/1999 | |
| WO | 0000580 A1 | 1/2000 | |
| WO | 2013167467 A1 | 11/2013 | |
| WO | 2017105919 A1 | 6/2017 | |

OTHER PUBLICATIONS

International Sarch Report and Written Opinion for corresponding PCT/EP2019/070480 mailed Oct. 4, 2019, 9 pages.
European Search Report for EP Patent Application No. 18188508.8, Issued on Feb. 1, 2019, 3 pages.

* cited by examiner

*Primary Examiner* — Brian P Mruk
(74) *Attorney, Agent, or Firm* — Armstrong Teasdale LLP

(57) ABSTRACT

Described herein is a process for manufacturing ethoxylated polyethylene-imines. Also described herein are the ethoxylated polyethyleneimines and methods for using the ethoxylated polyethyleneimines.

18 Claims, No Drawings

PROCESS FOR MANUFACTURING ALKOXYLATED POLYETHYLENEIMINES

CROSS-REFERENCE TO RELATED APPLICATIONS

This application is a U.S. National Phase Application of International Patent Application No. PCT/EP2019/070480, filed Jul. 30, 2019, which claims the benefit of priority to European Patent Application No. 18188508.8, filed Aug. 10, 2018, the entire contents of which are hereby incorporated by reference herein.

The present invention deals with a process for manufacturing alkoxylated polyethyleneimines, the alkoxylated polyethyleneimines and their use.

In the following, polyethyleneimine is also abbreviated "PEI". Ethoxylated polyethyleneimine is referred to as "EPEI" (or "ePEI").

Furthermore, ethylene oxide is referred to as "EO" in the following.

The preparation of alkoxylated, for example ethoxylated, polyethyleneimines is in principle known. It is also known that EPEIs may be used in laundry formulations. In particular, EPEIs are known to improve particulate soil removal from fabrics. Both process and use are described in EP112593. Sufficient EO is described to provide hydroxyethyl groups at each reactive site (=1 eq. EO per NH). Reacting polyalkylenimine with about one equivalent alkylene oxide per NH-function first, the so-called incipient alkoxylation, and to then convert with more alkylene oxide under alkaline catalysis has been already described in that publication.

The preparation of alkoxylated, for example ethoxylated, polyethyleneimines with higher molecular weight is in principle known, too (WO 99/01530). Such derivatives with MW 2000-5000 g/mol for the starting material, the PEI core, are described to have improved bleach stability in powder detergents, where in many cases an additional bleaching agent like sodium percarbonate is added later to the laundry formulation. The process described is applying 1.0 eq. of EO to form hydroxyethyl units at each reactive site, too.

The simple process described in both patent applications cited above leads to the formation of by-products and leads to negative properties of the final polymer, like decreased performance in application, malodor and dark color. The following publications describe some advanced state of the art processes for the alkoxylation of polyethyleneimines.

US 2010/0216949 discloses the preparation of PEI ethoxylates by pre-treating the PEI before reaction with EO. A combination of water addition and stripping (water removal and degassing) is applied in order to remove any volatile material from the PEI before reaction with EO. This procedure is supposed to prevent formation of by-products, in order to obtain pure products with better performance.

WO 99/16811 also describes a process for ethoxylation of PEI. The process describes the use of less than 1 eq. of EO in the first reaction step (under-hydroxyethylation). Preferably 0.75 1.0 eq. of EO are used in the first reaction step. The benefits of a polymer prepared by such a slight under-hydroxyethylation process is less malodor and less color.

However, the inclusion of ethoxylated polyethyleneimines prepared according to the known processes into laundry formulations may reduce the viscosity of the resulting liquid, leading to reduced consumer acceptability in the formulation, and hence the need to include additional viscosity-boosting technology (e.g. polymer thickeners) in the laundry formulation.

There was therefore a need in the art for a process for the preparation of EPEIs with improved properties in laundry formulations (in particular less negative impact on viscosity), while maintaining their original benefit on cleaning performance (primary and secondary).

It has now surprisingly been found that by using a two-step process for ethoxylation of the initial PEI and adjusting the amount of EO added in the first (and second) step to a certain range (strong under-hydroxyethylation), the problems of the state of the art can be significantly weakened.

The newly found ethoxylation process thus leads to EPEI products which may be beneficially used in laundry formulations (preferably liquid laundry formulations). In particular, the newly found ethoxylation process results in EPEIs which help to increase viscosity of liquid laundry formulations, while maintaining the cleaning performance, both with respect to known EPEIs according to the standard process.

One subject of the present invention is therefore a process for manufacturing ethoxylated polyethyleneimines (EPEI) by reacting at least one polyethyleneimine (PEI) with at least one ethylene oxide EO, wherein, in a first step (1), the polyethyleneimine (PEI) is reacted with ethylene oxide EO in a quantity of significantly less than one molar equivalent per PEI, and subsequently, in a second step (2), the product of step (1) is reacted with a further quantity of ethylene oxide EO, in the presence of a basic catalyst C.

Further subjects of the present invention include an ethoxylated polyethyleneimine, obtainable by the inventive process, and the use of an ethoxylated polyethyleneimine, obtainable by the inventive process, in laundry formulations, preferably liquid laundry formulations.

Preferably, the polyethyleneimine (PEI) has a molecular weight Mw (prior to ethoxylation) in the range of 1000 to 5000 g/mol, more preferably 1300 to 5000 g/mol, determined by gel permeation chromatography (GPC), with 1.5% by weight aqueous formic acid as eluent and cross-linked polyhydroxyethyl methacrylate as stationary phase (TSKgel GMPWXL column) and by using an RI detector and Pullulan standards (PSS GmbH, Mainz, Germany) for calibration.

In a preferred embodiment, the polyethyleneimine (PEI) has a molecular weight Mw (prior to ethoxylation) in the range of 1600 to 2400, more preferably 1800 to 2200, further preferably 1900 to 2100 g/mol (determined by GPC as mentioned above).

A suitable polyethyleneimine starting material in the context of this invention may, for example, be a homopolymer of ethyleneimine conforming to the (empirical) formula $-(CH_2-CH_2-NH)_n-$; in which n ranges from about 20 to about 120. Preferably n ranges from about 30 to about 120, more preferably from about 40 to about 60.

The polyethyleneimine starting material can vary in shape, including for example linear, branched, dendritic (hyperbranched) or comb-like structures, depending on the method of manufacture. Methods for the manufacture of such materials are generally acid-catalyzed reactions to open the ring of ethyleneimine, also known as aziridine.

Examples of suitable polyethyleneimine starting materials for use in the invention have a branched structure comprising three types of subunits, which may be randomly distributed. The subunits which make up the polymer are primary amine units having the formula: $[H_2NCH_2CH_2]-$ and $-NH_2$ which terminate the polymer main chain and any branching chains; secondary amine units having the formula $-[N(H)CH_2CH_2]-$ and tertiary amine units having the formula —[N(B)CH₂CH₂]— which are the branching points of the polymer, B representing a continuation of the chain structure by branching.

Branches may be ethyleneamino groups such as —CH₂CH₂—NH₂ groups; or longer groups such as —(CH₂CH₂)—N(CH₂CH₂NH₂)₂ or —(CH₂CH₂)—N(H)CH₂CH₂NH₂ groups. The mixture of primary, secondary, and tertiary amine units respectively may be in any molar ratio, including for example in a molar ratio of about 1:1:1 to about 1:2:1. The molar ratio of primary, secondary, and tertiary amine units respectively may for example be determined by $^{13}$C-NMR or $^{15}$N-NMR spectroscopy, preferably in D₂O. The degree of branching can be defined as follows: DB=D+T/D+T+L with D (dendritic) corresponding to the fraction of tertiary amine units, L (linear) corresponding to the fraction of secondary amine units and T (terminal) corresponding to the fraction of primary amine units. Suitably DB ranges from 0.25 to 0.95, preferably in the range from 0.30 to 0.80, and particularly preferably at least 0.5.

Preferred polyethyleneimines are branched polyethyleneimines, with a DB (degree of branching) preferably in the range from 0.30 to 0.80, and particularly preferably at least 0.5.

In the above polyethyleneimine starting material, each primary or secondary amine hydrogen atom represents a reactive site for subsequent ethoxylation. Preferably all of such hydrogen atoms are replaced by polyoxyethylene side chains, to form the ethoxylated polyethyleneimine for use in the invention. The polyoxyethylene side chains may suitably correspond to the formula R-(EO)$_n$-, in which (EO)$_n$ represents an ethylene oxide block; n is a number from 15 to 40, preferably from 20 to 35 and more preferably from 25 to 35; and R is hydrogen.

In a preferred embodiment of the present invention, PEIs display a polydispersity Q=$M_w/M_n$ of 3.4 at most, for example in the range of from 1.1 to 3.0, more preferably in the range of from 1.3 to 2.5 and even more preferably from 1.5 to 2.0.

In a special embodiment of the present invention, polyethyleneimines have a primary amine value in the range of from 1 to 1000 mg KOH/g, preferably from 10 to 500 mg KOH/g, most preferred from 50 to 300 mg KOH/g. The primary amine value can be determined according to ASTM D2074-07.

In one embodiment of the present invention, polyethyleneimines have a secondary amine value in the range of from 10 to 1000 mg KOH/g, preferably from 50 to 500 mg KOH/g, most preferred from 50 to 500 mg KOH/g. The secondary amine value can be determined according to ASTM D2074-07.

In a special embodiment of the present invention, polyethyleneimines have a tertiary amine value in the range of from 1 to 300 mg KOH/g, preferably from 5 to 200 mg KOH/g, most preferred from 10 to 100 mg KOH/g. The tertiary amine value can be determined according to ASTM D2074-07.

The molar share of tertiary N atoms may be determined by $^{15}$N-NMR spectroscopy. In cases that tertiary amine value and result according to $^{13}$C-NMR spectroscopy are inconsistent, the results obtained by $^{13}$C-NMR spectroscopy will be given preference.

Preferably, the polyethyleneimine starting material, provided in bulk or in solution, is pretreated (for example with a combination of water removal and degassing) before commencement of the first ethoxylation step (e.g. according to the procedure described in US 2010/0216949). In another embodiment of the inventive process, no pre-treatment is applied to the polyethyleneimine before the first ethoxylation step.

In a further embodiment of the inventive process, additionally 1 to 50% by weight, preferably 1 to 25% by weight, more preferably 2 to 18% by weight of water, relative to the unreacted, preferably pre-treated, polyethyleneimine (PEI), is added before initiating the first ethoxylation step (1).

The inventive process is characterized by using only ethylene oxide as alkoxylation agent. Other alkylene oxides like propylene oxide are not useful for the inventive process and do not lead to the inventive product and its properties in laundry application.

According to a preferred embodiment of the invention, the ethylene oxide is added in step (1) in an amount of 0.01 to 0.85 ethylene oxide units per NH-group of the polyethyleneimine (PEI), preferably 0.05 to 0.75, more preferably 0.1 to 0.7 ethylene oxide units per NH-group of the polyethyleneimine (PEI), further preferably 0.1 to 0.6 ethylene oxide units per NH-group of the polyethyleneimine (PEI), even more preferably 0.1 to 0.5 ethylene oxide units per NH-group of the polyethyleneimine (PEI) (strong under-hydroxyethylation).

In a preferred embodiment of the inventive process, the minimum amount of ethylene oxide units per NH-group added in step (1) is at least identical to the amount of basic catalyst C added later in step (2), or higher, in order to prevent formation of polyethylene glycol via direct reaction of catalyst C with ethylene oxide during step 2.

Preferably, the sum of the amounts of ethylene oxide EO added in steps (1) and (2) lies in the range of 15 to 40 ethylene oxide units per NH-group of the polyethyleneimine (PEI), more preferably 20 to 40 ethylene oxide units per NH-group of the polyethyleneimine (PEI), further preferably 25 to 35 ethylene oxide units per NH-group of the polyethyleneimine (PEI). Preferably, the first step (1) is carried out in the absence of a catalyst.

In one embodiment of the present invention, the second step (2) of the inventive process is carried out in the presence of a basic catalyst. Suitable bases are such as LiOH, NaOH, KOH, CsOH and mixtures thereof, sodium or potassium alkoxides such as potassium methylate (KOCH₃), potassium tert-butoxide, sodium ethoxide and sodium methylate (NaOCH₃), preferably potassium hydroxide and sodium hydroxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides, preference being given to potassium hydroxide and sodium hydroxide, and to alkali metal alkoxides, particular preference being given to potassium tbutoxide in t-butanol, sodium n-hexanolate in n-hexanol, and to sodium methanolate in nnonanol. Typical use amounts for the base are from 0.02 to 10% by weight, in particular from 0.05 to 1% by weight, based on the total amount of PEI and ethylene oxide.

In a preferred embodiment of the inventive process, the basic catalyst C is only used in the second step (2) and is selected from the group consisting of alkaline earth metal containing basic catalysts.

A specifically preferred embodiment of a basic catalyst in the inventive process is KOH; KOH may be used in the inventive process as a solution in water.

In an embodiment of the inventive process, the basic catalyst C is added in an amount of 0.05 to 0.3% by weight, preferably 0.15 to 0.25% by weight, relative to the ethoxylated polyethyleneimine (EPEI).

In an embodiment, the temperature during the first step (1) of the inventive process is in the range of 900 to 180° C., preferably 1000 to 170° C., more preferably 1100 to 160° C., further preferably 1200 to 145° C.

In an embodiment, the temperature during the second step (2) of the inventive process is in the range of 1000 to 250° C., preferably 1200 to 180° C., more preferably 130° C. to 180° C.

In one embodiment of the present invention, the reaction during the first step (1) of the inventive process may be carried out at a total pressure of up to 15 bar, preferably up to 10 bar, for example 2 to 6 bar. Preferred vessels for carrying out the reaction are autoclaves and tubular reactors.

In one embodiment of the present invention, the reaction during the second step (2) of the inventive process may be carried out at a total pressure of up to 15 bar, preferably up to 10 bar, for example 3 to 10 bar. Preferred vessels for carrying out the reaction are autoclaves and tubular reactors.

The product obtained after step (2), i.e. ethoxylated polyethyleneimine (EPEI), may be treated with a bleaching agent. The bleaching agent is preferably selected from the group consisting of borates, hypochlorites and borohydrates.

In the following, some embodiments of the inventive process are described.

The inventive process is preferably carried out in an autoclave.

In a preferred embodiment of the inventive process, a de-watered and C02-free polyethyleneimine (e.g. according to the procedure described in US 2010/0216949) is charged into the reaction vessel, preferably an autoclave. In another embodiment of the inventive process, no pre-treatment is applied to the polyethyleneimine before charging it into the reaction vessel.

Preferably, the (unreacted) polyethyleneimine is then dissolved in water. Preferably, a solution of 50% to 99% by weight PEI in water is provided, more preferably a solution of 75 to 99% by weight PEI in water, even more preferred a solution of 82 to 98% by weight.

In a preferred embodiment of the inventive process, the reaction vessel is subsequently purged with an inert gas (preferably nitrogen), made inert and brought to a pressure of 1 to 3 bar.

The reaction vessel is then preferably heated to a temperature of 90° to 180° C., preferably 100° to 170° C., more preferably 110° to 160° C., further preferably 120° to 145° C., and the first quantity of ethylene oxide (step (1)) is dosed in an amount of 0.01 to 0.85 ethylene oxide units per NH-group of the polyethyleneimine (PEI), preferably 0.1 to 0.7 ethylene oxide units per NH-group of the polyethyleneimine (PEI), further preferably 0.1 to 0.6 ethylene oxide units per NH-group of the polyethyleneimine (PEI), more preferably 0.1 to 0.5 ethylene oxide units per NH-group of the polyethyleneimine (PEI), preferably over a period of 30 minutes to 10 hours, more preferably 1 to 8 hours. In some embodiments, after dosing of ethylene oxide, the reaction is allowed to react further, preferably for a period of 10 minutes to 3 hours, more preferably 30 minutes to 2 hours.

Usually the reaction vessel is then purged with nitrogen to strip any residual EO.

In a preferred embodiment of the invention, the product is remaining in the initial reaction vessel and the ethoxylation is then directly continued by conversion of the partially (strongly under-) ethoxylated and stripped PEI according to the conditions described below for step (2) to the final EPEI.

In another embodiment of the invention, the partially (strongly under-) ethoxylated and stripped PEI, is removed from the reactor, transferred to another vessel and further stripped of water and any residual EO and/or stored until further conversion. Subsequently, the product is preferably charged into another clean and empty reaction vessel, for example another autoclave, to continue the conversion according to the conditions described below for step (2) to the final EPEI.

In a preferred embodiment of the inventive process, a basic catalyst, for example KOH in water, is dosed in the beginning of the second reaction step, and stirred with the partially ethoxylated PEI.

A step of water stripping follows, preferably at 120-130° C. and in vacuo (e.g. at 20 mbar or lower), for at least 1 h. The amount of water distilled off is being monitored, to ensure quantitative water removal from the autoclave. Typical residual amounts of water are below 1000 ppm, preferably even below 200 ppm.

Then, in an embodiment of the inventive process, the temperature is increased to 800 to 250° C., preferably 1000 to 250° C., even more preferably 120° to 180° C., and EO is dosed, preferably over a period of 2 to 25 hours, more preferably 5 to 20 hours. Usually, a post-reaction period of 1 to 10 hours, preferably 2 to 6 hours follows the dosing, to ensure quantitative EO conversion.

In an embodiment of the inventive process, the reaction can be stopped at any stage of the EO addition in step (2) by stopping the EO addition, optionally decreasing the temperature preferably to 40 to 120° C., waiting until the reaction pressure has normalized and thus the majority of the added EO has reacted, and subsequent stripping of residual EO. After the reaction has been stopped, intermediate EPEI material can be removed from the reactor, partially or completely, and the reaction can be continued with a certain part of the intermediate EPEI material that has been left in the reactor or by transferring the removed intermediate EPEI material, partially or completely, into another reaction vessel, by just increasing the temperature in the reaction vessel again to 800 to 250° C., preferably 1000 to 250° C., even more preferably 1200 to 180° C., and by resuming the EO dosing.

Optionally, even additional catalyst C can be dosed to the intermediate EPEI material, to further improve the reactivity of the terminal hydroxyl groups. In case of additional catalyst addition, additional stirring of the catalyst, preferably aqueous KOH solution, with the intermediate EPEI material is conducted, again followed by water stripping, preferably at 120-130° C., 20 mbar or lower, for at least 1 h. The amount of water distilled off is again being monitored, to ensure quantitative water removal from the autoclave.

After completion of the polymerization, the product (i.e. the final EPEI) is usually purged with nitrogen to strip any residual EO, and preferably also stripped of any further residual EO under vacuum (20 mbar) at an elevated temperature.

Optionally, the final product (i.e. EPEI) can be mixed with water in any ratio.

An optional step of work-up may also include the deactivation of the basic catalyst used in the second step (2), by addition of an organic or inorganic acid or by treatment with an ionexchange resin.

The inventive process can be carried out in a batch process (e.g. stirred tank vessel) or in a continuous process (e.g. loop reactor). It is also possible to carry out the preparation in a vessel that is a combination of stirred tank with an external heat exchanger (loop). In one embodiment of the present invention, the reaction may be carried out at a total pressure of up to 15 bar, preferably up to 10 bar, for example 2 to 10 bar.

The inventive reaction may for example be carried out in an autoclave or in a tubular reactor, or in a combination of both.

Information regarding the reactor equipment which can be used in the inventive process may also be taken from the standard literature, for example Mihail Ionescu, Chemistry and Technology of Polyolys for Polyurethanes, Rapra Press, 2008 or Yen-ni Chiu, Ethoxylation Reactor Modelling and Design, Swinburne University of Technology, 2005.

The finally obtained EPEI according to this invention have a weight-average molecular weight (determined by GPC/MALLS, cf. experimental part) of 25000 to 120000 g/mol, preferably 30000 to 100000 g/mol and even more preferred 35000 to 90000 g/mol. In a preferred embodiment of the invention, the EPEI have a weight-average molecular weight of 40000 to 50000 g/mol.

The inventive process using strong under-hydroxyethylation leads to materials that have a higher weight-average molecular weight and beneficial properties in application, in terms of viscosity control (higher viscosities), compared to materials prepared via the standard process using slight under-hydroxyethylation or even no under-hydroxyethylation. So for any given chemical composition with tailor-made cleaning performance, the inventive process leads to materials that have improved rheological behavior (higher viscosities) without negatively impacting their cleaning properties, compared to materials obtained from the standard process.

Therefore, the inventive process facilitates the synthesis of materials that represent the best compromise between best cleaning performance and minimized negative impact on viscosity of the laundry detergent.

EXAMPLES

Synthesis of Polymers

Example 1: Synthesis of Ethoxylated PEI P.1

A 2 liter autoclave was charged with 35.0 g of completely de-watered and $CO_2$-free PEI2000, according to the procedure described in US 2010/0216949. Then, the PEI2000 was brought to a 15% by weight solution in water, by addition of 6.1 g $H_2O$. The vessel was purged 3 times with nitrogen pressure of up to 5 bar, and finally the vessel was made inert with a 2 bar pad of nitrogen. The temperature was equilibrated at 100° C. and subsequently 26.0 g of ethylene oxide were dosed over 6 hours and allowed to react further for 1 hour. To this product, PEI2000+0.7EO/NH, was added 4.9 g 50 wt. % KOH in water and stirred. Subsequently, water was stripped out of the mixture at 120° C. for 2 hours at 10 mbar. The temperature was raised to 130° C., the vessel was made inert with a 2 bar pad of nitrogen, and 1158 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1226 g of a light brownish yellow solid were obtained.

Example 2: Synthesis of Ethoxylated PEI P.2

A 2 liter autoclave was charged with 508.5 g of completely de-watered and $CO_2$-free PEI2000, according to the procedure described in US 2010/0216949. Then, the PEI2000 was brought to an 85% by weight solution in water, by addition of 89.7 g $H_2O$. The vessel was purged 3 times with nitrogen pressure of up to 5 bar, and finally the vessel was made inert with a 2 bar pad of nitrogen. The temperature was equilibrated at 100° C. and subsequently 261 g of ethylene oxide were dosed over 6 hours and allowed to react further for 1 hour. The product, PEI2000+0.5EO/NH, was then purged with nitrogen to strip any residual EO, emptied from the reactor, and stripped of water and any residual EO. Of this material, 53.0 g were charged into a clean and empty 2 liter autoclave. 4.8 g 50 wt. % KOH in water was then dosed and stirred with the PEI2000+0.5EO/NH. Subsequently, water was stripped out of the mixture at 120° C. for 2 hours at 10 mbar. The temperature was then increased to 130° C., the vessel was made inert with a 2 bar pad of nitrogen, and 1150 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1223 g of a light brownish yellow solid were obtained.

Example 3: Synthesis of ethoxylated PEI P.3

A 2 liter autoclave was charged with 500.0 g of completely de-watered and $CO_2$-free PEI2000, according to the procedure described in US 2010/0216949. Then, the PEI2000 was brought to an 85% by weight solution in water, by addition of 88.3 g $H_2O$. The vessel was purged 3 times with nitrogen pressure of up to 5 bar, and finally the vessel was made inert with a 2 bar pad of nitrogen. The temperature was equilibrated at 100° C. and subsequently 52.0 g of ethylene oxide were dosed over 6 hours and allowed to react further for 1 hour. The product, PEI2000+0.1 EO/NH, was then purged with nitrogen to strip any residual EO, emptied from the reactor, and stripped of water and any residual EO. Of this material, 36.0 g were charged into a clean and empty 2 liter autoclave. 4.5 g 50 wt. % KOH in water was then dosed and stirred with the PEI2000+0.1EO/NH. Subsequently, water was stripped out of the mixture at 120° C. for 2 hours at 10 mbar. The temperature was then increased to 130° C. the vessel was made inert with a 1 bar pad of nitrogen, and 1084 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1142 g of a light brownish yellow solid were obtained.

Example 4: Synthesis of Ethoxylated PEI P.4

A 2 liter autoclave was charged with 35.0 g of PEI2000. No pre-treatment according to the procedure described in US 2010/0216949 has been conducted. Instead of that, the vessel was directly purged 3 times with nitrogen pressure of up to 5 bar, and finally the vessel was made inert with a 2 bar pad of nitrogen. The temperature was equilibrated at 100° C. and subsequently 18.0 g of ethylene oxide were dosed over 6 hours and allowed to react further for 1 hour. To this product, PEI2000+0.5EO/NH, was added 4.8 g 50 wt. % KOH in water and stirred. Subsequently, water was stripped out of the mixture at 120° C. for 2 hours at 10 mbar. The temperature was then increased to 130° C., the vessel was made inert with a 2 bar pad of nitrogen, and 1150 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1217 g of a light brownish yellow solid were obtained.

Example 5: Synthesis of Ethoxylated PEI P.5

A 2 liter autoclave was charged with 34.5 g of completely de-watered and $CO_2$-free PEI5000, according to the procedure described in US 2010/0216949. Then, the PEI5000 was brought to a 5% by weight solution in water, by addition of 2.1 g H2O. The vessel was purged 3 times with nitrogen pressure of up to 5 bar, and finally the vessel was made inert with a 2 bar pad of nitrogen. The temperature was equilibrated at 100° C. and subsequently 8.0 g of ethylene oxide were dosed over 6 hours and allowed to react further for 1 hour. To this product, PEI5000+0.2EO/NH, was added 4.4 g 50 wt. % KOH in water and stirred. Subsequently, water was stripped out of the mixture at 120° C. for 2 hours at 10 mbar. The temperature was maintained at 120° C., the vessel was made inert with a 2 bar pad of nitrogen, and 1049 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1102 g of a light brownish yellow solid were obtained.

Comparative Example 1: Synthesis of Ethoxylated PEI CP.1

A 2 liter autoclave was charged with 300.0 g of completely de-watered and CO2-free PEI800, according to the procedure described in US 2010/0216949. Then, the PEI800 was brought to an 85% by weight solution in water, by addition of 82.0 g H2O. The vessel was purged 3 times with nitrogen pressure of up to 5 bar, and finally the vessel was made inert with a 2 bar pad of nitrogen. The temperature was equilibrated at 100° C. and subsequently 246 g of ethylene oxide were dosed over 6 hours and allowed to react further for 1 hour. The product, PEI800+0.8EO/NH, was then purged with nitrogen to strip any residual EO, emptied from the reactor, and stripped of water and any residual EO. Of this material, 55.0 g were charged into a clean and empty 2 liter autoclave. 3.8 g 50 wt. % KOH in water was then dosed and stirred with the PEI800+0.8EO/NH. Subsequently, water was stripped out of the mixture at 120° C. for 2 hours at 10 mbar. The temperature was then increased to 130° C., the vessel was made inert with a 2 bar pad of nitrogen, and 900 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 961 g of a light brownish yellow solid were obtained.

Comparative Example 2: Synthesis of Ethoxylated PEI CP.2

A 2 liter autoclave was charged with 300.0 g of completely de-watered and C02-free PEI800, according to the procedure described in US 201010216949. Then, the PEI800 was brought to an 85% by weight solution in water, by addition of 82.0 g H2O. The vessel was purged 3 times with nitrogen pressure of up to 5 bar, and finally the vessel was made inert with a 2 bar pad of nitrogen. The temperature was equilibrated at 100° C. and subsequently 154 g of ethylene oxide were dosed over 6 hours and allowed to react further for 1 hour. The product, PEI800+0.5EO/NH, was then purged with nitrogen to strip any residual EO, emptied from the reactor, and stripped of water and any residual EO. Of this material, 52.2 g were charged into a clean and empty 2 liter autoclave. 4.4 g 50 wt. % KOH in water was then dosed and stirred with the PEI800+0.5EO/NH. Subsequently, water was stripped out of the mixture at 120° C. for 2 hours at 10 mbar. The temperature was then increased to 130° C., the vessel was made inert with a 2 bar pad of nitrogen, and 1040 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1110 g of a light brownish yellow solid were obtained.

Comparative Example 3: Synthesis of Ethoxylated PEI CP.3

A 2 liter autoclave was charged with 500.0 g of completely de-watered and C02-free PEI2000, according to the procedure described in US 2010/0216949. Then, the PEI2000 was brought to an 85% by weight solution in water, by addition of 88.3 g H2O. The vessel was purged 3 times with nitrogen pressure of up to 5 bar, and finally the vessel was made inert with a 2 bar pad of nitrogen. The temperature was equilibrated at 100° C. and subsequently 461 g of ethylene oxide were dosed over 6 hours and allowed to react further for 1 hour. The product, PEI2000+0.9EO/NH, was then purged with nitrogen to strip any residual EO, emptied from the reactor, and stripped of water and any residual EO. Of this material, 60.0 g were charged into a clean and empty 2 liter autoclave. 4.3 g 50 wt. % KOH in water was then dosed and stirred with the PEI2000+0.9 EO/NH. Subsequently, water was stripped out of the mixture at 120° C. for 2 hours at 10 mbar. The temperature was then increased to 130° C., the vessel was made inert with a 2 bar pad of nitrogen, and 1011 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1094 g of a light brownish yellow solid were obtained.

Comparative Example 4: Synthesis of Ethoxylated PEI CP.4

A 2 liter autoclave was charged with 50.0 g of completely de-watered and C02-free PEI2000, according to the procedure described in US 2010/0216949. The vessel was purged 3 times with nitrogen pressure of up to 5 bar, and finally the vessel was made inert with a 2 bar pad of nitrogen. The temperature was equilibrated at 100° C. and subsequently 6.9 g 50 wt. % KOH in water was added and stirred. Water was stripped out of the mixture at 130° C. for 2 hours at 10 mbar. The temperature was maintained at 130° C., the vessel was made inert with a 2 bar pad of nitrogen, and 1025 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1098 g of a light brownish yellow solid were obtained.

Comparative Example 5: Synthesis of Ethoxylated PEI CP.5

A 2 liter autoclave was charged with 495.0 g of completely de-watered and C02-free PEI2000, according to the procedure described in US 2010/0216949. Then, the PEI2000 was brought to an 85% by weight solution in water, by addition of 87.4 g H2O. The vessel was purged 3 times with nitrogen pressure of up to 5 bar, and finally the vessel was made inert with a 2 bar pad of nitrogen. The temperature was equilibrated at 100° C. and subsequently 335 g of propylene oxide were dosed over 6 hours and allowed to react further for 1 hour. The product, PEI2000+0.5 PO/NH, was then purged with nitrogen to strip any residual PO, emptied from the reactor, and stripped of water and any residual PO. Of this material, 53.0 g were charged into a clean and empty 2 liter autoclave. 4.4 g 50 wt. % KOH in water was then dosed and stirred with the PEI2000+0.5 PO/NH. Subsequently, water was stripped out of the mixture at 120° C. for 2 hours at 10 mbar. The temperature was then increased to 130° C., the vessel was made inert with a 2 bar pad of nitrogen, and 1038 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1100.9 g of a light brownish yellow solid were obtained.

Comparative Example 6: Synthesis of Ethoxylated PEI CP.6

A 2 liter autoclave was charged with 34.5 g of completely de-watered and C02-free PEI5000, according to the procedure described in US 2010/0216949. Then, the PEI5000 was brought to a 5% by weight solution in water, by addition of 1.9 g H2O. The vessel was purged 3 times with nitrogen pressure of up to 5 bar, and finally the vessel was made inert with a 2 bar pad of nitrogen. The temperature was equilibrated at 100° C. and subsequently 35.0 g of ethylene oxide were dosed over 6 hours and allowed to react further for 1 hour. To this product, PEI5000+0.9EO/NH, was added 4.4 g 50 wt. % KOH in water and stirred. Subsequently, water was stripped out of the mixture at 120° C. for 2 hours at 10 mbar. The temperature was maintained at 120° C., the vessel was made inert with a 2 bar pad of nitrogen, and 1022 g of ethylene oxide were dosed over 12 hours, at a total pressure of approx. 3.5 bar (initial pressure) to approx. 8 bar (pressure at the end of the EO dosing), and allowed to post-react for at least 3 hours. The sample was then purged with nitrogen to strip any residual EO, emptied from the reactor, and stripped of water and any residual EO in vacuo (20 mbar, 90° C.). 1085 g of a light brownish yellow solid were obtained.

Comparative Example 7: Synthesis of Ethoxylated PEI CP.7

A 2 liter autoclave was charged with 350.0 g of PEI2000. No pre-treatment according to the procedure described in US 2010/0216949 has been conducted. Instead of that, the PEI2000 was brought to an 96% by weight solution in water, by addition of 14.0 g H2O. The vessel was purged 3 times with nitrogen pressure of up to 5 bar, and finally the vessel was made inert with a 2 bar pad of nitrogen. The temperature was equilibrated at 120° C. and subsequently 323 g of ethylene oxide were dosed over 6 hours and allowed to react further for 10 hours. The product, PEI2000+0.9EO/NH, was then purged with nitrogen to strip any residual EO, emptied from the reactor, and stripped of water and any residual EO. Of this material, 36.0 g were charged into a clean and empty 2 liter autoclave. To this product, PEI2000+0.9EO/NH, was added 4.0 g 50 wt. % KOH in water and stirred. Subsequently, water was stripped out of the mixture at 100° C. for 2 hours at 10 mbar. The temperature was then increased to 120° C., the vessel was made inert with a 2 bar pad of nitrogen, and 951 g of ethylene oxide were dosed over 18 hours, at a total pressure of approx. 3.5 bar (initial pressure) to approx. 8 bar (pressure at the end of the EO dosing), and allowed to post-react for another 12 hours. The sample was then purged with nitrogen to strip any residual EO, emptied from the reactor, and stripped of water and any residual EO in vacuo (20 mbar, 90° C.). 990 g of a light brownish yellow solid were obtained.

Characterization of Polymers

Molecular weights were determined by gel permeation chromatography (GPC). The conditions applied were either 1.5% by weight aqueous formic acid as eluent and cross-linked polyhydroxyethyl methacrylate as stationary phase for the polyethylene imine starting materials; Or 0.05% by weight potassium trifluoroacetate in hexafluoroisopropanol (HFIP) as eluent and cross-linked polystyrene/divinylbenzene as stationary phase for the final products, the ethoxylated polyethyleneimines. In case of the polyethyleneimine starting materials, the molecular weight was obtained by using an RI detector and Pullulan standards (PSS GmbH, Mainz, Germany) for calibration. In case of the final materials, the ethoxylated polyethyleneimines, a MALLS detector was used and absolute weight-average molecular weights were obtained.

Analytical data of the PEI ethoxylates are summarized in table 1.

TABLE 1

Composition and physicochemical characterization of PEI ethoxylates.

| Polymer | PEI $M_w$ [g/mol] * | PEI degassing | Water in step 1 |
|---|---|---|---|
| P.1 | 2000 | Y | Y |
| P.2 | 2000 | Y | Y |
| P.3 | 2000 | Y | Y |
| P.4 | 2000 | N | N |
| P.5 | 5000 | Y | Y |
| CP.1 | 800 | Y | Y |
| CP.2 | 800 | Y | Y |
| CP.3 | 2000 | Y | Y |
| CP.4 | 2000 | Y | Y |
| CP.5 | 2000 | Y | Y |
| CP.6 | 5000 | Y | Y |
| CP.7 | 2000 | N | N |

TABLE 1-continued

Composition and physicochemical characterization of PEI ethoxylates.

| Polymer | Number of EO/NH in step 1 | Number of EO/NH in step 2 | Total number of EO/NH | $M_w$ (GPC) [g/mol] ** |
|---|---|---|---|---|
| P.1 | 0.7 | 31.8 | 32.5 | 40500 |
| P.2 | 0.5 | 32.0 | 32.5 | 42000 |
| P.3 | 0.1 | 32.4 | 32.5 | 41000 |
| P.4 | 0.5 | 32.0 | 32.5 | 44500 |
| P.5 | 0.2 | 29.8 | 30.0 | 88600 |
| CP.1 | 0.8 | 29.2 | 30.0 | 12000 |
| CP.2 | 0.5 | 29.5 | 30.0 | 22700 |
| CP.3 | 0.9 | 31.6 | 32.5 | 35800 |
| CP.4 | 0.0 | 20 | 20 | 10900 |
| CP.5 | 0.5 PO | 32.0 | 32.5 (PO + EO) | 36000 |
| CP.6 | 0.9 | 29.1 | 30.0 | 76800 |
| CP.7 | 0.9 | 49.1 | 50.0 | n.d. |

Additionally, commercially available PEI ethoxylate Sokalan ® HP20 (BASF SE, Ludwigshafen, Germany) based on a PEI 800 g/mol * starting material and approx. 20 EO/NH ($M_w$ 9900 g/mol ** is used for comparison.
* Determined by gel permeation chromatography (GPC), with 1.5% by weight aqueous formic acid as eluent and cross-linked polyhydroxyethyl methacrylate as stationary phase (TSKgel GMPWXL column); RI detector and Pullulan standards (PSS GmbH, Mainz, Germany) for calibration.

The data in table 1 clearly shows that the inventive process characterized by applying strong under-hydroxyethylation (<0.9 EO/NH in the first reaction step) leads to significantly higher weight-average molecular weight compared to slight under-hydroxyethylation (0.9 EO/NH in the first reaction step) as known in the prior art (by comparing polymers P.1-P.4 vs. CP.3 and P.5 vs. CP.6). It can be also seen that a maximum weight-average molecular weight is achieved for the PEI2000 starting material, if an under-hydroxyethylation of 0.5 EO/NH is applied. The presence of water and/or the pre-treatment of the PEI before the strong under-hydroxyethylation does not seem to be critical for the inventive process (P.2 vs. P.4), however pre-treatment can additionally lead to better physical appearance of the products (color, odor; as described in US 2010/0216949). The reason for the higher weight-average molecular weight observed upon strong under-hydroxyethylation is not a result of less by-products (confirmed by GPC), thus the assumption is that it is caused by a higher polydispersity in the PEG chains that are attached to the PEI core. The higher polydispersity in the attached PEG chains leads to higher weight-average molecular weight of the final macromolecule while maintaining the same molecular composition (PEI:EO ratio), thus leading to new materials with new properties in application (see below). The data in table 1 also shows that a 1-step process (CP.4) does not lead to high molecular weights at all, since the catalyst KOH seems to react by itself with EO, thus leading to huge amounts of by-product (PEG) in this case (confirmed by GPC). Therefore, it can be concluded that the lower end of the under-hydroxyethylation approach is clearly defined by the amount of catalyst (e.g. KOH) added to the system: The amount of added hydroxyethyl groups in the first reaction step should be identical or higher compared to the amount of KOH added at a later point, before initializing the second step. Furthermore, the data in table 1 shows that a strong under-alkoxylation with propylene oxide (CP.5) does not lead to higher molecular weights either, due to limited reactivity of the attached secondary hydroxyl group.

Application Experiments

Viscosity:

To determine the influence of the polymers on the viscosity of the liquid laundry formulations, in each case 1.45% by weight of an PEI ethoxylate was formulated into the liquid detergent containing a fixed level of either 0.75% by weight of a HASE thickening polymer (formulation F.1), or 1.05% by weight of a HASE thickening polymer (formulation F.2). In both cases, the pH was adjusted with an aqueous 50 wt % solution of NaOH to pH 7.5. The formulations were stirred with a magnetic stirrer for 2 h and subsequently stored for another 24 h w/o mechanical agitation. The viscosities of the samples were then measured using a rotational rheometer Rheolab QC (Anton Paar, Ostfildern, Germany), either with spindle CC27 or DG42 (depending on absolute viscosity) at room temperature (25° C.). The measurement was conducted from 0 to 1200 1/s shear rate. Table 1 shows the composition of the final formulations, Table 2 summarizes the obtained viscosities at a shear rate of 20 1/s.

TABLE 2

Composition of liquid laundry formulations.

| Ingredients | F.1 [wt %] * | F.2 [wt %] * |
|---|---|---|
| Linear $C_{12}C_{14}$-alkylbenzenesulfonic acid | 2.72 | 2.72 |
| $C_{12}$-fatty alcohol x 3 EO sulfate | 2.04 | 2.04 |
| $C_{12}C_{15}$-fatty alcohol x 7 EO | 2.04 | 2.04 |
| C12-C18 fatty acid | 0.40 | 0.40 |
| HASE thickening polymer | 0.75 | 1.05 |
| 1-Hydroxyethane-1,1-diphosphonic acid (HEDP) | 0.70 | 0.70 |
| Triethanolamine | 3.52 | 3.52 |
| Fragrance | 0.65 | 0.65 |
| Preservative | 0.03 | 0.03 |
| Ethoxylated PEI polymer | P.1-P.4, CP.1-CP.5: 1.45 | P.5, CP.6: 1.45 |
| Sodium hydroxide | ad pH 7.5 | ad pH 7.5 |
| Demin. water | ad 100 | ad 100 |
| pH value | 7.5 | 7.5 |

* All data are wt % active ingredient, independent of the respective product form.

TABLE 3

Viscosity of liquid laundry formulations.

| Formulation | Polymer | PEI $M_w$ [g/mol] | Viscosity [mPa*s] * |
|---|---|---|---|
| F.1 | P.1 | 2000 | 1450 +/− 10 |
| F.1 | P.2 | 2000 | 1510 +/− 10 |
| F.1 | P.3 | 2000 | 1540 +/− 10 |
| F.1 | P.4 | 2000 | 1480 +/− 10 |
| F.1 | CP.1 | 800 | 1010 +/− 10 |
| F.1 | CP.2 | 800 | 740 +/− 10 |
| F.1 | CP.3 | 2000 | 1230 +/− 10 |
| F.1 | CP.4 | 2000 | 950 +/− 10 |
| F.1 | CP.5 | 2000 | 1270 +/− 10 |
| F.1 | Sokalan ® HP20 | 800 | 680 +/− 10 |
| F.2 | w/o | — | 2300 +/− 10 |
| F.2 | P.5 | 5000 | 2220 +/− 10 |
| F.2 | CP.6 | 5000 | 1890 +/− 10 |
| F.2 | Sokalan ® HP20 | 800 | 770 +/− 10 |

* The linear standard deviation of the applied method is +/− 10 mPa*s, derived from measurements of 3 identical formulations.

The data in table 3 shows that all PEI ethoxylates (that are used in laundry detergents to boost cleaning performance) lead to a certain decrease of the viscosity of the liquid laundry formulation, due to negative interaction with the thickening system. Thus, more thickening agent is required in all cases to maintain the viscosity on the original level, which is often not preferred. However, the data in table 3 also clearly shows that the inventive PEI ethoxylates based on a process of strong under-hydroxyethylation exhibit much less negative impact on the viscosity of the formulations, and thus lead to significantly higher viscosities in laundry formulations compared to the non-inventive polymers based only on slight under-hydroxyethylation (or based on using propylene oxide instead of ethylene oxide, or based on PEIs as starting materials with a Mw outside of the inventive range). The effect of the inventive process on the viscosities can be seen when comparing polymers with identical PEI core size (PEI2000: P.1-P.4 vs. CP.3-CP.5; And PEI5000: P.5 vs. CP.6). Strong under-hydroxyethylation does not lead to improved viscosities if applied to low molecular weight PEI starting materials (PEI800: CP.2 vs. CP.1). It can be also seen that in general higher molecular weights lead to higher viscosities in the formulations, thus PEI5000 based samples lead to higher viscosities than PEI2000 based samples and the latter ones lead to higher viscosities than PEI800 based samples. Therefore, the reason for the improved properties of the inventive polymers seems to be their higher molecular weight due to the higher polydispersity in the attached PEG chains, while maintaining the original chemical composition (PEL:EO ratio).

Primary Cleaning Performance:

To determine the primary detergency, the cleaning performance on a circular red pottery stain on polyester fabric (Warwick Equest, Consett, UK) was measured by determining the color difference (delta E) between the stain after wash and the unsoiled white fabric using a reflectometer (Datacolor SF600 plus). The smaller the difference, the better the cleaning performance of the respective liquid laundry detergent. 4 circular red pottery stains were used in 1 experiment, each experiment was repeated 3 times, thus a total of 12 washed stains per test condition were obtained to calculate the average delta E value. Table 3 shows the composition of the laundry detergents, Table 4 shows the washing test conditions and Table 5 summarizes the obtained cleaning performance data (delta E). Table 5 also shows the standardized cleaning performance delta delta E (i.e. the difference of the performance of the laundry detergent including the respective PEI ethoxylate vs. the laundry detergent w/o any PEI ethoxylate). The bigger the delta delta E value, the bigger the positive contribution of the respective PEI ethoxylate on the cleaning performance.

TABLE 4

Composition of liquid laundry detergents.

| Ingredients | LLD.1 * |
| --- | --- |
| Linear $C_{12}C_{14}$-alkyl-benzenesulfonic acid | 8.00 |
| $C_{12}$-fatty alcohol × 3 EO sulfate | 6.00 |
| $C_{12}C_{15}$-fatty alcohol × 7 EO | 6.00 |
| Mono propylene glycol (MPG) | 6.00 |
| Triethanolamine | 2.50 |
| Sodium hydroxide | 0.40 |
| Demin. water | add 100 |
| pH value | 7.4 |

* All data are wt % active ingredient, independent of the respective product form.

TABLE 5

Washing conditions for evaluation of primary detergency.
Washing conditions

| Device | Linitest+ from SDL Atlas, Rock Hill, USA |
| --- | --- |
| Washing liquor | 200 mL |
| Washing time | 30 minutes |
| Washing temperature | 40° C. |
| Detergent concentration | 3.0 g/L |
| Water hardness (Ca:Mg:HCO3) | 1.2 mmol/L (4:2:3) (12° fH) |
| Fabric to liquor ratio | 1:10 |
| PEI ethoxylate addition | 2.5% by weight (vs. liquid laundry detergent) |
| Test fabric * | 4 circular red pottery stains on polyester fabric (Warwick Equest, Consett, UK) |
| Ballast fabric | Polyester and cotton ballast, to yield a 1:1 ratio of polyester/cotton fabric per experiment |

* After the washing experiment, the test fabrics were rinsed with 12° fH water (2 times), followed by drying at ambient room temperature overnight, prior to the measurement with the reflectometer.

TABLE 6

Results from washing tests.

| Detergent | PEI ethoxylate | Concentration of PEI ethoxylate additive | delta E | 95% CL | delta delta E |
| --- | --- | --- | --- | --- | --- |
| LLD.1 | w/o | — | 30.4 | 0.8 | — |
| LLD.1 | Sokalan ® HP20 | 2.5 wt % | 24.8 | 0.6 | 5.6 |
| LLD.1 | P.1 | 2.5 wt % | 25.3 | 1.4 | 5.1 |
| LLD.1 | P.2 | 2.5 wt % | 25.4 | 0.6 | 5.0 |
| LLD.1 | P.3 | 2.5 wt % | 24.8 | 0.7 | 5.6 |
| LLD.1 | P.5 | 2.5 wt % | 26.5 | 1.1 | 3.9 |
| LLD.1 | CP.3 | 2.5 wt % | 25.5 | 1.1 | 4.9 |
| LLD.1 | CP.7 | 2.5 wt % | 28.5 | 0.5 | 1.9 |

The data in table 6 shows that the inventive polymers P.1-P.3 exhibit identical primary cleaning performance compared to the benchmark (Sokalan® HP20). Compared to the noninventive polymer CP.3 (prepared via slight under-hydroxyethylation), their cleaning performance is also at least equivalent, however negative effects on viscosity are significantly lower (cf. table 3). The inventive polymer P.5 (based on a PEI5000 starting material), which exhibits very high viscosities upon implementation in a laundry formulation, still exhibits significant cleaning benefits, however its cleaning performance is slightly worse than Sokalan® HP20. This leads to the conclusion that the best compromise of improved viscosity (vs. Sokalan® HP20) and identical cleaning performance can be obtained by using the inventive PEI ethoxylates based on strong under-hydroxyethylation and based on a PEI2000 core. Simply increasing the molecular weight of the PEI ethoxylates by increasing the EO chain length (CP.7: 50 EO/NH) is no alternative since such an approach will change the molecular composition (lower PEI:EO ratio) and thus leading to significantly decreased cleaning performance vs. benchmark (Sokalan® HP20).

PEI ethoxylates with high molecular weight, especially the ones based on PEI2000 and PEI5000 starting materials, are preferred ingredients in laundry detergents, since their higher molecular weight vs. Sokalan® HP20 (due to a bigger PEI core size (2000/5000 vs. 800) and longer EO chain (30-35 vs. approx. 20)) generally leads to higher viscosities. Further increase of either PEI core size (>5000 g/mol) or EO chain length (>40 EO/NH) leads to a significant decrease of cleaning performance, therefore such an approach is not appropriate. In contrast to that, the inventive process via strong under-hydroxyethylation (samples P.1-P.5) allows for significant increase of molecular weight without changing the chemical composition. The increased molecular weight further improves the viscosities of laundry formulations, whereas the unchanged chemical composition ensures a consistent cleaning performance.

What is claimed:

1. A process for manufacturing ethoxylated polyethyleneimines by reacting at least one polyethyleneimine (PEI) with at least one ethylene oxide EO, wherein, in a first step (1), the polyethyleneimine (PEI) is reacted with ethylene oxide EO in a quantity of less than one molar equivalent per PEI, and subsequently, in a second step (2), the product of step (1) is reacted with a further quantity of ethylene oxide EO, in the presence of a basic catalyst C, and wherein the ethylene oxide EO is added in step (1) in an amount of 0.01 to 0.85 ethylene oxide units per NH-group of the polyethyleneimine (PEI), and wherein the polyethyleneimine (PEI) has a weight average molecular weight Mw prior to ethoxylation in the range of 1000 to 5000.

2. The process according to claim 1, wherein the polyethyleneimine (PEI) has a weight average molecular weight Mw prior to ethoxylation in the range of 1300 to 5000.

3. The process according to claim 1, wherein the polyethyleneimine (PEI) has a weight average molecular weight Mw prior to ethoxylation in the range of 1600 to 2400.

4. The process according to claim 1, wherein the ethylene oxide EO is added in step (1) in an amount of 0.1 to 0.7 ethylene oxide units per NH-group of the polyethyleneimine (PEI).

5. The process according to claim 1, wherein the sum of the amounts of ethylene oxide EO added in steps (1) and (2) lies in the range of 15 to 40 ethylene oxide units per NH-group of the polyethyleneimine (PEI).

6. The process according to claim 1, wherein the basic catalyst C is selected from the group consisting of alkaline earth metal containing basic catalysts.

7. The process according to claim 1, wherein the basic catalyst C is selected from the group consisting of LiOH, NaOH, KOH, CsOH and mixtures thereof.

8. The process according to claim 1, wherein the basic catalyst C is added in an amount of 0.05 to 0.3% by weight relative to the ethoxylated polyethyleneimine (EPEI).

9. The process according to claim 1, wherein the temperature during the first step (1) is in the range of 90° to 180° C.

10. The process according to claim 1, wherein the temperature during the second step (2) is in the range of 1000 to 250° C.

11. The process according to claim 1, wherein additionally 1 to 50% by weight of water, relative to the unreacted polyethyleneimine (PEI), is added in the first step (1).

12. The process according to claim 1, wherein the product obtained after step (2) is treated with a bleaching agent.

13. The process according to claim 12, wherein the bleaching agent is selected from the group consisting of borates, hypochlorites and borohydrates.

14. The process of claim 1, wherein the weight average molecular weight Mw prior to ethoxylation is determined by gel permeation chromatography (GPC), with 1.5% by weight aqueous formic acid as eluent and cross-linked polyhydroxyethyl methacrylate as stationary phase and by using an RI detector and Pullulan standards for calibration.

15. The process according to claim 1, wherein the polyethyleneimine (PEI) has a weight average molecular weight Mw prior to ethoxylation in the range of 1800 to 2200.

16. The process according to claim 1, wherein the sum of the amounts of ethylene oxide EO added in steps (1) and (2) lies in the range of 20 to 40 ethylene oxide units per NH-group of the polyethyleneimine (PEI).

17. The process according to claim 1, wherein the basic catalyst C is selected from the group consisting of mixtures containing KOH.

18. The process according to claim 1, wherein the basic catalyst C is added in an amount of 0.15 to 0.25% by weight, relative to the ethoxylated polyethyleneimine (EPEI).

* * * * *